Aug. 13, 1968    P. J. HUBBARD    3,396,681
CYCLONIC REACTOR
Filed Dec. 6, 1967    4 Sheets-Sheet 2

INVENTOR.
PETER J. HUBBARD
BY: Arnold Grant
ATTORNEY.

INVENTOR.
PETER J. HUBBARD
BY: Arnold Gray
ATTORNEY.

Aug. 13, 1968

P. J. HUBBARD 3,396,681

CYCLONIC REACTOR

Filed Dec. 6, 1967

INVENTOR.
PETER J. HUBBARD

BY: *Arnold Grant*

ATTORNEY.

United States Patent Office 3,396,681
Patented Aug. 13, 1968

3,396,681
CYCLONIC REACTOR
Peter J. Hubbard, Norwalk, Conn., assignor to Dorr-Oliver Incorporated, Stamford, Conn., a corporation of Delaware
Continuation-in-part of application Ser. No. 524,715, Feb. 3, 1966. This application Dec. 6, 1967, Ser. No. 688,558
30 Claims. (Cl. 110—8)

ABSTRACT OF THE DISCLOSURE

The present invention relates to a cyclonic reactor for thermally treating sludge. The reactor comprises an outer housing having a shell therein in spaced relation to the inner wall of the housing. Combustion gases are introduced into the space between the housing and the shell before they are channeled into the shell, thereby heating both the inside and outside of the shell. Feed material is introduced at either end of the shell, axially or transversely to the longitudinal axis of the shell. The thermally treated products are removed by a discharge conduit which extends axially into the shell.

This application is a continuation-in-part of application Ser. No. 524,715, filed Feb. 3, 1966, and now abandoned.

The present invention relates to a thermal reactor and method which finds particular application in the treatment of organic waste material. It is particularly intended for small communities and industrial users requiring a simple, inexpensive reactor where first cost, compactness, and simplicity of operation are the primary considerations.

One of the main objectives of the invention is the subdivision of the feed material into finely divided particles followed by extremely rapid drying and, if desired, combustion.

In attaining the above objects, applicant provides a cyclonic thermal reactor which utilizes high velocity swirling hot combustion gases to heat both sides of a thin heat-conducting shell which encompasses the combustion zone.

Further objects of the invention are to provide a system which avoids building-up of feed material on the interior surface of the combustion chamber, which produces finely divided ash which is automatically removed by entrainment with the exhaust gases, and to provide for thermal expansion of the heat conducting shell.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings, in which:

Figure 1:
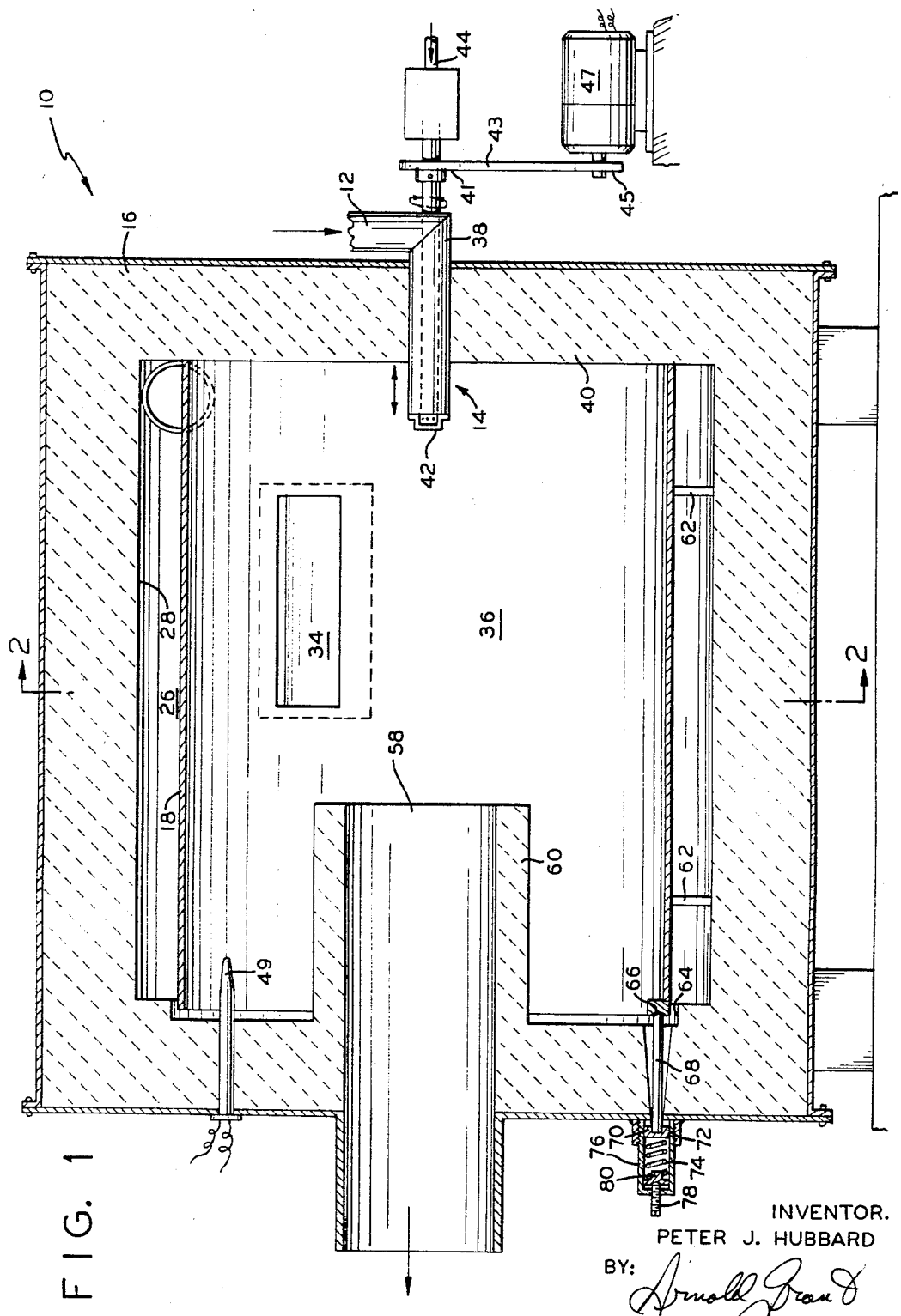
FIGURE 1 is a side elevation of applicant's cyclonic thermal reactor taken in section along the line 1—1 of FIGURE 2.

Referring now to the drawings, material to be treated in the cyclonic thermal reactor 10 is introduced through conduit 12 to feed tube 14. The cyclonic thermal reactor 10 has an outer housing 16 of refractory material and an inner, concentrically spaced, shell 18 of heat resistant and heat conducting material, preferably stainless steel. A conventional furnace gun 20, supplied with fuel through inlet 22 and combustion air through inlet 24, feeds primary combustion air tangentially into the annular space 26 between the inner wall 28 of the housing 16 and the outer wall of the concentric shell 18. Secondary combustion air, to supply any additional oxygen needed, is also introduced tangentially, into the space 26, through inlets 32. The primary and secondary air, both of which are forced into the space 26 at relatively high speed, circumnavigate the shell, transferring heat and bringing the shell up to substantially the same temperature as the gases.

These combustion gases continue their circular corkscrew pattern in the annular space 26 until they are intercepted by a tangential inlet 34, adjustably mounted on the periphery of the outer wall of shell 18 to scoop the gases and channel them into the combustion chamber 36 in the shell. The exact positioning of the inlets 34, relative to the entry points of the primary and secondary combustion air, is largely dependent on the position of the feed tube 14, as will be explained in greater detail below, and the type of thermal treatment being performed in the reactor, i.e., drying to complete incineration. By positioning the inlet 34 at one extreme end of the shell and introducing the primary and secondary combustion gases into the space 26 at the other end of the shell, the shell will have its outer surface heated substantially along its entire length. If, on the other hand, the particular type of thermal treatment being performed at the time only requires a portion of the outer surface of the shell to be heated, e.g., in the zone of the feed inlet or immediately adjacent the discharge, then the relative positioning of inlets 20, 32, and 34 can be adjusted accordingly. The high speed and relatively tangential entrance of the combustion gases into the combustion chamber 36 creates a cyclonic effect in the combustion chamber which, as will presently be described, swirls the feed material in a corkscrew motion along the inner longitudinal wall of the shell 18.

Figure 2:
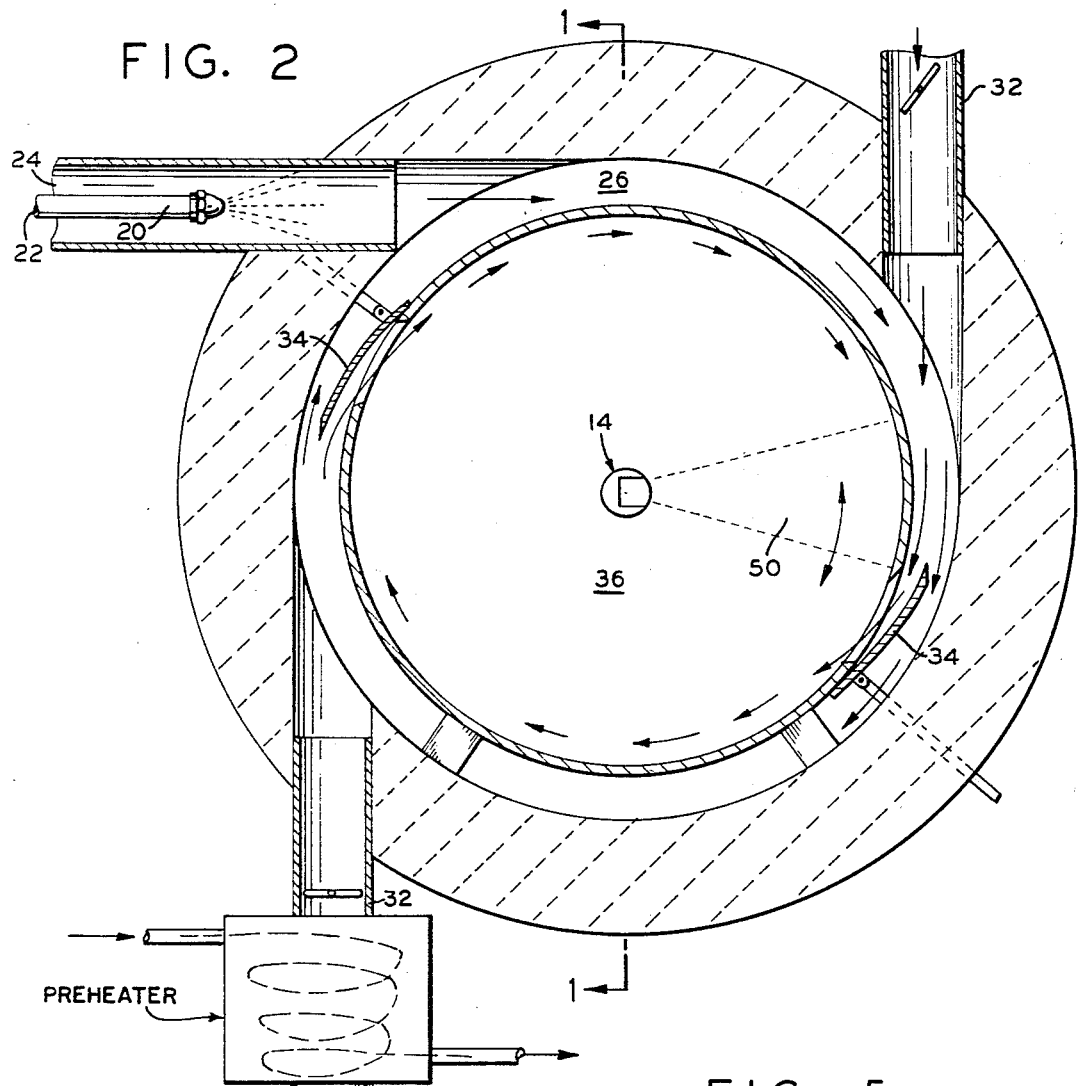
FIGURE 2 is a cross-sectional view of the cyclonic thermal reactor shown in FIGURE 1 taken along the line 2—2 of FIGURE 1.
Figure 6:
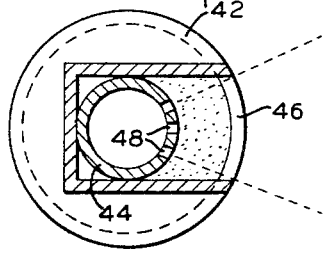
FIGURE 6 is a section view on the line 5—5 of the nozzle shown in FIGURE 5 showing in shaded area the feed discharge opening.
Figure 5:
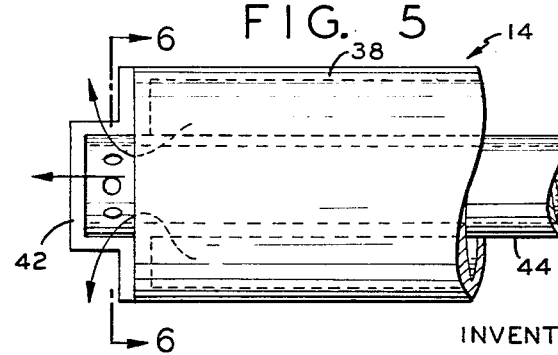
FIGURE 5 is an enlarged vertical side view of the atomizing spray nozzle.

Referring now more particularly to FIGURES 1, 2, and 5 the first embodiment for introducing feed material to the combustion chamber 36 will be described in detail. In this embodiment the feed tube 14 comprises an outer tube 38, which extends axially through the end refractory wall 40 of the housing 16 into the open-ended shell 18, an end plate 42, and a rotatably-mounted concentric compressed air conduit 44. Tube 38 is slideable in wall 40 of housing 16 but is held against rotation, while air conduit 44 concentrically rotates within tube 38 to discharge feed material against selected portions of combustion chamber 36. End plate 42 is secured to compressed air conduit 44 and has a feed discharge opening 46 radically aligned with the air blast openings 48 of the compressed air conduit. The result is, as shown in FIGURE 2, a rotating cone, or fan-shaped spray, 50 which progressively discharges the feed material over selected zones of heated stainless steel shell 18.

A suitable drive mechanism consisting of a pulley 41, secured to the compressed air tube, is driven by a belt 43 from pulley 45 of a variable speed motor 47, by means of which the speed of rotation of the compressed air tube may be varied to attain optimum operation. A pyrometer 49, which may extend through the refractory wall into the combustion chamber or into the discharge conduit (not shown), is connected to suitable controls for automatically increasing or decreasing the supply of fuel to inlet 22 or the rate of introduction of feed material to the system.

Figure 3:
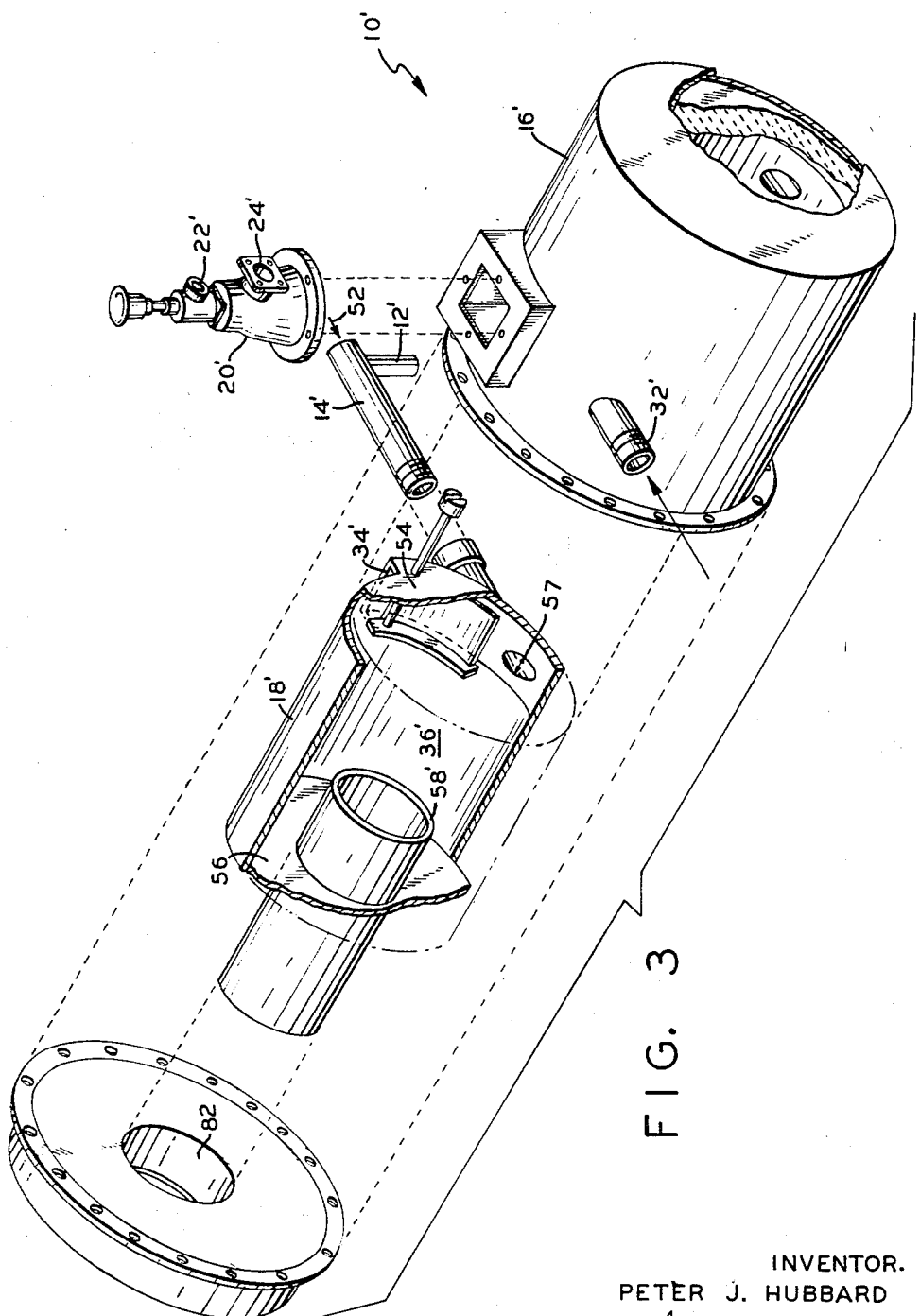
FIGURE 3 is an exploded perspective view showing a modification of applicant's cyclonic thermal reactor.
Figure 4:
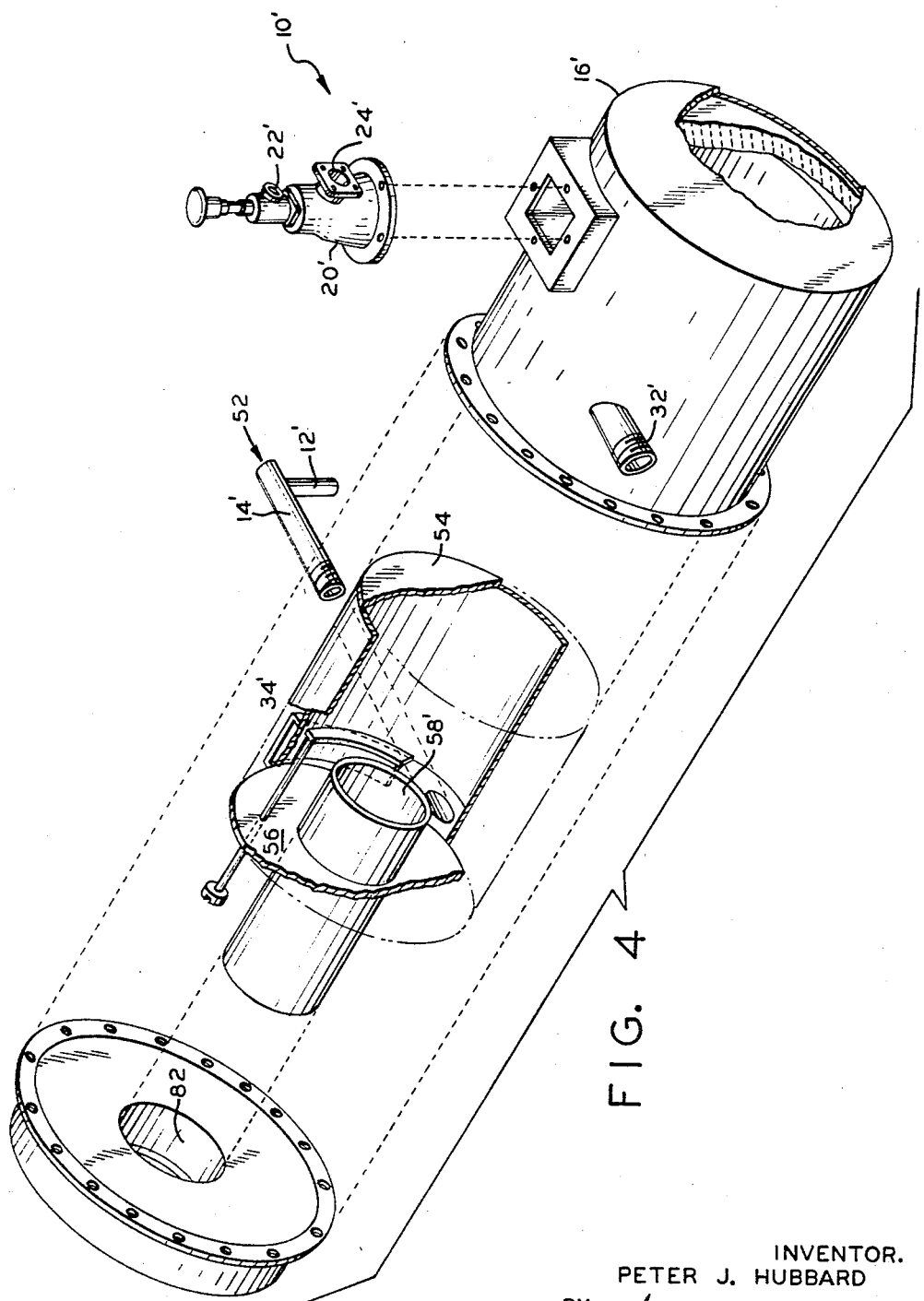
FIGURE 4 is an exploded perspective view showing a further modification of applicant's cyclonic thermal reactor.

Referring now to FIGURES 3 and 4, an alternative method for introducing feed material to the combustion chamber 36' will be described in detail. Applicant has found that the feed material can be introduced, transversely, through the longitudinal wall of the shell 18' directly into the cyclonic stream in the combustion chamber 36'. To this end, the feed tube 14', in FIGURE 3, is positioned transversely to the longitudinal wall of the reactor, preferably with its lower edge on a tangent with the inner longitudinal wall of the shell 18'. Air, to atomize and propel the feed material into the cyclonic stream, is introduced at one end 52 of the feed tube 14' and the atomized material is sprayed into the cyclonic stream of gases in the combustion chamber, preferably tangentially to the cyclonic stream. Feeding tangentially to the cyclonic stream enables the feed tube 14' to be positioned along the lower edge of the shell 18'. In this manner, any difficult-to-pump solids, such as primary sludge, will not have a vertical component in their transfer path from any pretreatment station to the feed tube. With this arrangement the pretreatment station can be positioned above the level of the feed tube, to make use of gravity, without raising the height of the building enclosing the system. Tangential feeding is also advantageous in that it maximizes utilization of the energy expended to atomize the feed. Introducing the feed and its atomizing-entraining gases tangentially into the cyclonically rotating gases in the combustion chamber adds the velocity of the atomizing-entraining gases to that of the cyclonic gases already in the chamber. Still another advantage is that tangential feed simplifies the design of the unit because it eliminates the rotating nozzle. It should be understood, however, that any other method and angle of entry may be used to introduce the feed material to the combustion chamber through the longitudinal wall of the shell.

When first experimenting with the axial and transverse methods of feeding shown in FIGURES 1 and 3, applicant theorized that the feed nozzle must be at the opposite end of the shell from the shell discharge in order for the thermal treatment process to obtain full enjoyment of the entire length of the shell. Subsequent analyses, however, has shown that if the feed material is to be introduced transversely, through the longitudinal wall of the shell, it may be introduced at either end of the shell. By either end, is means that if the shell were divided into three sections of equal length, the feed can be effectively introduced in either of the extreme sections.

Thus, for example, if the feed were introduced within the one-third section of the shell adjacent reactor end wall 54, as shown in FIGURE 3, and the thermally finished products exited through reactor end wall 56, the entrained feed would move axially, in a cyclonic path, along the periphery of the longitudinal wall from the feed end toward the discharge end. The comminuting effect of the swirling path of the feed particles interacts with the thermal treatment imparted by the hot entraining gases to produce, by the time the particles have reached the discharge end 56 of the shell, a desired particle size which has received a desired degree of thermal treatment. The geometry of the cyclonic thermal reactor is such, as will be explained in greater detail below, that an entrained particle of a specified size correspondingly denote a specified degree of thermal treatment. When the thermally-treated, entrained particles have reached the far end 56, those particles which have reecived the desired treatment, i.e., are smaller than a predetermined size, turn inwardly on themselves and, moving in a cyclonic pattern, between the main cyclonic body of entrained solids and the discharge conduit, turn back toward the entrance mouth of the discharge conduit. The larger particles continue their swirling path around the periphery of the wall until they are sufficiently comminuted to move inwardly and become entrained in the discharge stream.

If, on the other hand, the feed tube 14" were positioned within the one-third section of the shell adjacent the reactor discharge end 56', as shown in FIGURE 4, the initial cyclonic path of the entrained solids would be from the discharge end 56' to the other extreme end wall 54'. Again, at the far wall, the size separation will be made with the smaller particles, i.e., those which have received the desired degree of thermal treatment, turning inwardly on themselves and changing direction, forming a second cyclonic flow, moving within the main body of entrained solids, turn back toward the entrance mouth of the discharge conduit. In both cases, the main body of entrained solids is moving in one direction, away from the feed tube, while the fully treated solids are moving in a second cyclonic stream, in an opposite direction from the main cyclonic stream from the far wall to the discharge conduit.

In experimenting with longitudinal wall introduction of the feed material, applicant has found that with a length to diameter ratio for the shell of from 1 to 4 the length of the feed inlet 57 (FIGURE 3) to the combustion chamber optimumly should be within the range of from 5–20% of the length of the wall of the shell. A feed conduit having an entrance conduit much smaller than the desired range could not supply enough feed to the combustion chamber to maintain economic operation. An entrance mouth much larger than the desired range would have an adverse effect on the geometry-detention time relationship, to be presently described.

The discharge conduit 58 extends axially through the end wall into the combustion chamber of the reactor to receive the second, oppositely moving stream and transfer the thermally treated entrained products from the reactor. There may be, as shown in FIGURE 1, an annular refractory wall 60, extending inwardly from the refractory wall of the housing 16, surrounding the discharge conduit to form, together with the shell 18, a circular raceway to retain oversize particles. These particles, as explained above, circulate in the raceway as long as the centrifugal force due to their size is sufficient to overcome the entraining effect of the discharge stream of gases.

The discharge conduit 58' shown in FIGURES 3 and 4 is of the type described in applicant's copending application Ser. No. 619,478, filed Feb. 28, 1967, i.e., the conduit may be adjusted, by automatic or manual means, so that its relative length in the combustion chamber may be changed to a variety of predetermined positions to satisfy a variety of thermal treatment requirements. Changing the relative length that the discharge conduit extends into combustion chamber effectively changes the geometry of the chamber and correspondingly the type of thermal treatment, from drying to complete incineration, received by a particular feed material. The further the discharge conduit extends into the chamber 36 the longer will be the detention time and, therefore, the amount of heat transferred to the particles.

In the combustion of organic waste material, the temperature in the shell is normally on the order of 1400° F. It is, therefore, subject to substantial thermal expansion.

This problem may be countered, as shown in the embodiment of FIGURES 1 and 2 by loosely supporting the open-ended shell within the housing on four longitudinally and transversely spaced feet 62. These feet are of such length that when the shell is cold they support the shell eccentrically within the chamber. On the other hand, when the shell is expanded it is substantially concentric and spaced the radial length of the feet from the inner wall of the housing on all sides. In order to allow longitudinal expansion and yet prevent leakage when the shell is expanded between the shell end and the end of the combustion chamber, there is provided, at the exhaust end of the chamber, an annular shoulder 64 having a diameter which is greater than the diameter of the shell when cold by the amount of expansion of the shell from cold to combustion temperatures. This annular shoulder also has a cylindrical surface transverse to the axis of the chamber and spaced from the other end of the chamber by an amount substantially equal to the longitudinal length of the shell when fully expanded at combustion temperatures. Thus, when the shell is fully expanded at combustion temperature, it fits snugly against the shoulder, thereby closing the combustion chamber, and preventing leakage around the end of the shell.

To avoid leakage when cold at the end of the combustion chamber in which the combustion gases first enter, resilient means are provided for pressing the shell against that end of the chamber. These consist of a lug 66, secured to the inside of the shell, a depression receiving-spring-pressed pin 68, urged against the depression by pin engaging depression 70, spring cap 72 pressed by a spring 74 held in place within a cylinder 76 and an adjustable set screw 78 engaging a spring cap 80 for tensioning the spring.

The embodiments of FIGURES 3 and 4 differ from that of FIGURES 1 and 2 by having end walls on the shell, i.e., the shell is a closed, self-contained, unit. If the feed material is to be introduced axially, through one of the end walls, the problem of thermal expansion can be countered by the arrangement described above or by the apparatus disclosed in copending application Ser. No. 619,478. However, if the feed is to be introduced transversely, through a longitudinal wall of the shell, either the above, support-foot, arrangement may be used; or alternatively, the shell may be suspended in the housing supported only by the discharge conduit 58' bearing up against the bore 82 in refractory wall 56 of the housing. The expansion of the stainless steel of the discharge conduit vis a vis the refractory brick of the housing is relatively slight so that the fit of the discharge conduit 58' in the bore 82 can be fairly close. A compressible annular seal, not shown, surrounds the discharge conduit in the bore to prevent any heat from escaping the area between the housing and the shell. Completely enclosing the combustion chamber also has the added advantage of preventing any heat loss from the combustion chamber regardless of the state of the combustion process, e.g., warm-up or shut down, and regardless of the relative position of the shell to the housing.

As this invention may be embodied in several forms without departing from the spirit or essential character thereof, the present embodiments are illustrative and not restrictive. The scope of the invention is defined by the appended claims rather than by the description preceding them, and all embodiments which fall within the meaning and range of equivalency of the claims are, therefore, intended to be embraced by those claims.

I claim:

1. A thermal reactor for heat treating sludge comprising in combination, a housing having two end walls and a longitudinal interior wall; a shell of heat conducting material mounted within said housing in spaced relation thereto to provide a gas space between said interior wall and the outer surface of said shell; means for supplying combustion gases into the space between said housing interior wall and said shell to heat the outer surface of said shell; means adjacent one end of said housing to spray the sludge against the interior surface of said heated shell; means for supplying sludge to said spray means; an exhaust outlet for combustion products; and, at least one opening for admitting hot combustion gases from said space into the interior of said shell.

2. The invention according to claim 1, in which means are included for supplying secondary air into said shell for burning the sludge.

3. The invention according to claim 1, in which means are provided for varying the effective size of said openings.

4. The invention according to claim 1, in which said spray means includes a nozzle having a first means for receiving the sludge and a second means within said first means to receive air under pressure, said nozzle being constructed and arranged to direct a stream of said spray against the interior of said heated shell, and means for moving said nozzle to cause said spray to travel over a selected portion of said shell.

5. The invention according to claim 1, in which said spray means includes a nozzle having means for receiving the sludge and air under pressure, said nozzle being constructed and arranged to direct a stream of said spray in a generally radial direction with respect to the longitudinal axis of said shell to impinge at any one time on a portion of said shell circumference, and means for rotating said nozzle to cause said spray to travel around the circumference of said shell to evenly distribute the spray over said circumference.

6. The invention according to claim 1, in which said spray means includes a nozzle having means for receiving the sludge and air under pressure, said nozzle being constructed and arranged to direct a stream of said spray in a generally radial direction with respect to the longitudinal axis of said shell into the stream of hot combustion gases in said shell.

7. The invention according to claim 1 wherein said shell is generally cylindrical in shape, the length of said shell being at least equal to the diameter of said shell.

8. The invention according to claim 1, in which the exhaust end of said chamber is provided with an axially projecting ridge surrounding said exhaust openings said ridge cooperating with the interior surface of said shell to form a raceway for retaining large pieces of thermally treated feed material under the influence of centrifugal force until disintegrated into particles small enough to be entrained by the exhaust gases.

9. The invention according to claim 1, further comprising means providing for thermal expansion within the housing of said shell comprising supports between said shell and housing loosely spacing the shell from the housing while permitting longitudinal and radial expansion, the ends of said housing being spaced apart a distance substantially equal to length of said shell when cold plus the amount of thermal expansion of the shell when at combustion temperature thereby substantially preventing leakage at said ends.

10. The invention according to claim 1, wherein said shell is closed at at least one end thereof, said exhaust outlet for combustion products extending through the housing and through the closed end of said shell into said shell, said exhaust outlet providing at least a portion of the support for said shell in said housing to maintain the shell in spaced apart relation to the longitudinal wall of said housing.

11. The invention according to claim 1, wherein said means adjacent one end of said housing to spray sludge into the interior of said heated shell extends axially through one end wall of said housing into said shell.

12. The invention according to claim 1, wherein said means adjacent one end of said housing to spray sludge against the interior of said heated shell extends transversely through the longitudinal wall of said housing into said shell.

13. The invention according to claim 12, wherein said means introduces the sludge tangentially to the inner wall of said shell.

14. The invention according to claim 12, wherein said shell has an opening in its longitudinally wall to receive said spray means, the length of said opening being within the range of 5 to 20 percent of the length of said shell.

15. A thermal reactor for heat treating sludge comprising in combination, a housing having a longitudinal interior wall; a generally cylindrical shell of heat-conducting material mounted within said housing in spaced relation to the interior wall of said housing to provide a gas space between said interior wall and the outer surface of said shell, said shell having a feed end and a discharge end, the length of said shell being at least equal to the diameter of said shell; means for supplying combustion gases between said housing interior wall and said shell to heat the outer surface of said shell; at least one opening in said shell adjacent the feed end of said shell for admitting hot combustion gases from said space into the interior of said shell, the gases traversing the length of said shell in a generally cyclonic path from the feed end to the discharge end; means adjacent the feed end of said shell for introducing the sludge into said shell; and an exhaust outlet at the discharge end of said shell for removing the thermally treated products from said shell.

16. The method of incinerating waste sludge in an annular combustion shell of heat conducting material enclosed within and spaced from an outer housing, which comprises, the steps of directing gases at combustion temperatures into the space between the housing and said shell, then directing the combustion gases into the combustion shell, thereafter exhausting the gases from the combustion shell to subject the outer and inner surfaces of the combustion shell to combustion gases, atomizing the sludge and spraying it to impinge on a localized area of the inner surface of said combustion shell to deflect dried sludge particles into the space within the combustion shell to complete their combustion therein, and causing said localized spray area to repetitively traverse said shell to avoid any build-up of unburned material on the combustion shell surface.

17. The invention according to claim 16, in which said local impingement area is caused to rotate about the circumference of said combustion chamber shell.

18. The invention according to claim 16, which further includes the step of entraining finely divided ash resulting from the combustion of the atomized sludge in the exhaust combustion gases to remove said ash.

19. The invention according to claim 18, which further includes the step of retaining any ash particles too large to be entrained in the exhaust gases, in said combustion gases until disintegrated against the shell wall to entrainable size.

20. The invention according to claim 16, which further comprises the steps of preheating secondary combustion air, introducing the preheated secondary air into the space between the housing and the inner shell to mix with said hot combustion gases and circulate in said space and feeding the mixed gases from said space into the inner combustion shell.

21. A thermal reactor for heat treating organic material comprising a longitudinally extending housing having an interior wall; a generally cylindrical shell having an inner surface and an outer surface mounted in said housing in spaced apart relation to said interior wall, the length of said shell being at least equal to the diameter of said shell; means for supplying combustion gases into the space between the interior wall of the housing and the outer surface of said shell to heat the outer surface of said shell; means at one end of said reactor for feeding an organic material against the inner surface of said shell to thermally treat the organic material; at least one means on the outer surface of said shell adjacent the feed end of said reactor to transfer the hot combustion gases from the space between the interior wall of said housing and the outer surface of said shell into said shell, the gases entraining the organic material and transporting it in a generally cyclonic path along the walls of said shell; and, exhaust means that discharge the products of said shell from said thermal reactor.

22. A thermal reactor for heat treating organic waste material as defined in claim 21 further including at least one means for supplying secondary combustion air into the space between said interior wall and the outer surface of said shell, and at least one means for transferring the secondary combustion air from said space into said shell.

23. A thermal reactor for heat treating organic waste material as defined in claim 22, further including ridge means circumscribing said exhaust means to form with the inner surface of said shell an annular raceway for retaining large pieces of thermally treated organic feed material under the influence of the circumferentially moving combustion gases.

24. A thermal reactor for heat treating organic waste material as defined in claim 23, wherein said means for introducing said organic feed material into said shell comprises a nozzle constructed and arranged to direct a spray of the feed material against the inner surface of said shell in a generally radial direction with respect to the longitudinal axis of said shell to impinge at any one time on a portion of said shell interior surface, and means for rotating said nozzle causing said spray to travel over select portions of said shell.

25. The invention according to claim 21, wherein said means at one end of said reactor for feeding an organic material against the inner surface of said shell extends transversely through the longitudinal wall of said housing into said shell.

26. The invention according to claim 25, wherein said means introduces the organic material tangentially to the inner wall of said shell.

27. The invention according to claim 25, wherein said shell has an opening in its longitudinal wall to receive said feed means, the length of said opening being within the range of five to twenty percent of the length of said shell.

28. A thermal reactor for heat treating flowable material comprising in combination, a housing having two end walls and a longitudinal wall connecting the end walls, a circular shell of heat conducting material mounted within said housing in spaced relation thereto to provide a gas space between said interior of the housing and the outer surface of said shell; means for supplying combustion gases into the space between said housing interior wall and said shell and into the shell for circular movement therein to heat said shell; means to direct the material against the interior surface of said heated shell; instrumentalities for supplying the material to said means; a cylindrical exhaust tube having a substantial portion of its length of uniform diameter which portion is closely fitted within said opening in substantially gas tight relation thereto and projects into the interior of said chamber to provide a vortex former and a circular raceway to detain material being treated before passing out through said exhaust tube by entrainment in the exhausting combustion gases.

29. The invention defined in claim 28 in which said tube and said end wall are so constructed and arranged that, at least initially, the tube may be adjusted longitudinally in the end wall opening to project a predetermined distance into the chamber and thus determine the detention time of the material in the chamber.

30. A thermal reactor for heat treating sludge comprising a longitudinally extending housing, a shell of heat conducting material mounted within said housing in spaced relation thereto provide an outer chamber between said housing and said shell, at least one conduit to supply hot combustion gases from burning fuel and combustion air to said outer chamber, inlet means in said shell to channel the combustion gases from said outer chamber into said shell, means at one end of said shell to feed organic waste material into said shell, and an exhaust conduit extending into said combustion chamber to establish the location of a vortex which rotates the thermally reacted products around the axis of the vortex before discharging them from the combustion chamber, said conduit being adjustable relative to said chamber to vary the depth of the vortex and the position at which the thermally reacted products will discharge from the combustion chamber.

References Cited

UNITED STATES PATENTS

| 1,179,192 | 4/1916 | Kleinschmidt. | |
| 2,242,653 | 5/1941 | Maxwell | 110—7 |
| 2,566,731 | 9/1951 | Komline | 110—8 |
| 3,124,086 | 3/1964 | Sage et al. | 110—28 |

FOREIGN PATENTS 518,173  11/1931  Germany.

JAMES W. WESTHAVER, *Primary Examiner.*